United States Patent [19]

Nuss

[11] Patent Number: 4,842,671
[45] Date of Patent: Jun. 27, 1989

[54] APPARATUS FOR CONNECTING ELONGATE MATERIAL SUCH AS ELECTRICAL CONDUCTORS BY MEANS OF ULTRASONICS

[75] Inventor: Lothar Nuss, Offenbach, Fed. Rep. of Germany

[73] Assignee: Stapla Ultraschall-Technik GmbH, Frankfurt, Fed. Rep. of Germany

[21] Appl. No.: 98,068

[22] Filed: Sep. 17, 1987

[30] Foreign Application Priority Data

Oct. 23, 1986 [DE] Fed. Rep. of Germany ....... 3636072
Mar. 31, 1987 [DE] Fed. Rep. of Germany ....... 3710603

[51] Int. Cl.⁴ .................. B29C 65/08; B65H 69/08
[52] U.S. Cl. ................................... 156/433; 156/73.2; 156/73.4; 156/502; 156/579; 156/580.1; 156/580.2; 228/1.1; 228/904
[58] Field of Search .............. 156/73.2, 73.4, 158, 156/304.2, 433, 502, 579, 580.1, 580.2; 140/113, 117; 228/1.1, 904

[56] References Cited

U.S. PATENT DOCUMENTS

| | | | |
|---|---|---|---|
| 3,184,354 | 5/1965 | Strother | 156/73.2 |
| 3,323,971 | 6/1967 | Williams | 156/502 |
| 3,391,440 | 7/1968 | Harms | 100/26 |
| 3,917,146 | 11/1975 | Culp | 228/1.1 |
| 4,106,973 | 8/1978 | Wright | 156/433 |
| 4,534,817 | 8/1985 | O'Sullivan | 156/579 |

Primary Examiner—Michael Wityshyn
Attorney, Agent, or Firm—Allegretti & Witcoff, Ltd.

[57] ABSTRACT

In an apparatus intended especially for connecting electrical conductors by ultrasonic welding, in which a two-part anvil comprising three working surfaces is associated with a sonotrode for defining a compaction chamber on all sides, the two anvil parts are moveable in two different directions relative to each other and the sonotrode and are each driven by a pneumatic cylinder and piston assembly. To achieve an easily handled apparatus, the two pneumatic cylinders are disposed alongside each other axially parallel to each other and to the central axis of the sonotrode in a housing and act upon transmission elements, which deflect the working movements of the pneumatic pistons through a right angle into the anvil parts. As a result the apparatus has a slender external form of small dimensions and enables a pistol grip handle to be fitted, by a trigger of which the functional parts of the apparatus are controlled. In a further embodiment the housing can be releasably connected either to a pistol grip-like handle or to a coupling element.

21 Claims, 8 Drawing Sheets

APPARATUS FOR CONNECTING ELONGATE MATERIAL SUCH AS ELECTRICAL CONDUCTORS BY MEANS OF ULTRASONICS

FIELD OF INVENTION

This invention relates to an apparatus for connecting elongate material such as wires, cords, sheet strips or the like of metal or plastics, especially electrical conductors such as strands, by means of ultrasonics.

BACKGROUND OF INVENTION

The present apparatus is intended to be suitable basically for the connecting together of elongate objects of the initially specified type, provided that these in regard to their material properties are suitable for connection by ultrasonics and their cross-sections permit them to be laid in the compaction chamber. Purely for simplification, the discussion that follows relates only to electrical conductors, the connecting together of which by ultrasonics is a principal field of application of the present invention. Especially in the automobile manufacturing industry, a large number of node connections on electrical conductors, such as copper strands, have to be carried out on every automobile.

DESCRIPTION OF PRIOR ART

A known form of such apparatus comprises a housing, a sonotrode mounted fixed on the housing and generating ultrasonic vibrations, a two-part anvil having in total three working surfaces and a compaction chamber, adjustable in its cross-sectional dimensions to different cross-sections of the objects to be connected and bounded by the sonotrode and the working surfaces of the anvil, the end faces of which compaction chamber are permanently open for the passage of the objects to be connected, wherein the two anvil parts are mounted on the housing moveable in two different directions relative to each other and to the sonotrode, and for this purpose are drivingly connected with pneumatic cylinder-and-piston assemblies fixed to the housing.

One known apparatus (DE-OS No. 35 08 122) has already proved very satisfactory especially for the aforementioned field of use, because in it a very variable compaction chamber is achieved, due especially to the construction and relationship of the two anvil parts to each other and to a single, fixed sonotrode. This chamber can be adapted, not only in its height but also in its width, to all practically occurring use situations, without different sonotrodes or sonotrode projections having to be used for that purpose as is the case in other known apparatuses (DE-PS No. 31 51 151, DE-OS No. 33 35 254). The known apparatuses mentioned here must be considered predominantly for a stationary use, on account of their not inconsiderable dimensions and weights.

A mobile apparatus (DE-OS No. 33 16 873) has indeed already been proposed, which is intended to be used as a hand device, but this known apparatus also has such large dimensions and accordingly a high weight, that its use as a hand device is questionable. In this known apparatus, in which only one anvil part is provided, with the result that compaction chambers of different sizes can be obtained only by rotating anvil and sonotrode and thereby making possible different pairs of sonotrode depressions and associated anvil projections at the expense of the complex adjustment operations which then have to be carried out, the anvil and the sonotrode are constructed to be tilted about axes preferably located at a right angle to each other.

In order to make possible the pivoting or tilting movements necessary in this known apparatus for operating the tool, the pneumatic cylinders used for this purpose are also orientated in respect of their axes at right angles to each other and also to the longitudinal axis of the sonotrode, with the result that the apparatus is very bulky. At its forward end also, it has very large dimensions, because the pneumatic cylinder for the anvil pivoting movement lies in a plane perpendicular to the anvil and sonotrode head, so that the apparatus cannot be used for constricted spaces. Furthermore, its handle is at the top of the apparatus, so that it can be used only suspended for low working positions, unless the operator stands on something raised. Furthermore, between the working tools sonotrode and anvil, on the one hand, and the sonotrode pivot axis, on the other hand, there is such a large distance that a complicated counter-bearing also has to be provided, in order to withstand the forces occurring during the welding operation. Finally, the known apparatus does not possess control devices, so that the handle is constructed only for guiding the apparatus but not for actuating its tools, which makes operation very difficult and one-handed operation completely impossible.

SUMMARY OF INVENTION

According to the present invention, there is provided an apparatus for joining elongate material by means of ultrasonics, the apparatus comprising a housing, a sonotrode mounted on the housing for generating ultrasonic vibrations, a two-part anvil comprising three working surfaces and a compaction chamber, which is adjustable in its cross-sectional dimensions to relate to the different cross-sections of the objects to be joined, the compaction chamber being bounded by the sonotrode and the working surfaces of the anvil and having end faces which are open for the passage of the object to be joined, the two parts of the anvil being mounted on the housing so as to be moveable in two different directions relative to each other and to the sonotrode, and there being pneumatic piston and cylinder assemblies in the housing alongside each other and axially parallel to each other and to the central axis of the sonotrode; the apparatus further comprising transmission elements on which said piston and cylinder assemblies act, which transmission elements are arranged to deflect rectilinear working movement perpendicularly into the respective anvil parts and there being a handle mounted in the manner of a pistol grip on the housing, which handle is equipped with a trigger controlling the drive of the anvil parts and the ultrasonic action of the apparatus.

On account of the special arrangement of the two pneumatic cylinders to each other and to the sonotrode, the present apparatus has a slender external shape, which makes possible use of the apparatus even in constricted working spaces. As a result and due to the pistol grip type handle, which in the manner of usual pistol butts is fitted beneath the apparatus, the apparatus can be comfortably guided with one hand like a pistol and also actuated by means of the trigger, mounted similar to that on a pistol. The other hand of the operator can be employed for inserting and removing the electrical conductors to be connected together into and from the compaction chamber. The two anvil parts and the sonotrode are so disposed at the forward end of the apparatus that the compaction chamber is so located with its front end face approximately where the muzzle is located in a pistol weapon. The present apparatus is, therefore, in use directed with its longitudinal axis onto the place of work and is brought with its tools in the correct position for working.

With advantage, the handle is mounted on the housing somewhat below the centre of gravity of the other parts of the apparatus which are combined to form one unit. This place of fitting leads to a balanced positioning of the apparatus in the hand of the operator and thus favours easy handling of the apparatus.

The deflection of the rectilinear working movement of the transmission elements into the direction of movement of the anvil parts may be carried out in that the transmission elements are guided longitudinally displaceable in the housing parallel to the central axis of the sonotrode, are each on the one hand firmly connected with the piston rod of the associated pneumatic piston and on the other hand possess a guide path orientated at an acute angle to its rectilinear direction of working movement, which guide path is in working engagement with a guide element on the associated anvil part. In this manner, a direct deflecting of the direction of movement of the pneumatic cylinder and piston assemblies to the associated anvil parts takes place, without bulky elements having to be used for this purpose.

In one advantageous embodiment, at least one of the transmission elements possesses, as a guide path, a link slit, into which a guide pin fixed to the associated anvil part engages. This leads to a movement positively controlled by the link slit for the relevant anvil part.

A further advantageous possibility of changing the direction of movement consists in that at least one of the transmission elements possesses, at its end, a cone or the like as guide path, which bears against a corresponding counter-surface on the associated anvil part. In this way also, a deflection through a right angle of the force transmission onto the anvil parts is facilitated by simple means.

Preferably, the arrangement is such that the transmission element equipped with a link slit is associated with an anvil part mounted displaceable in a straight line in the housing, whereas the transmission element equipped with a cone or the like is associated with an anvil part pivotal about a bearing pin of the housing. In this connection the link guide is used for the anvil part that requires a comparatively large adjustment travel, whereas the cone or the like causes a relatively small pivotal travel of the other anvil part.

In one advantageous form of embodiment, the arrangement is such that the trigger fitted to the handle is constructed for actuating the pneumatic valves and/or electrical microswitches fixed inside the handle. Accordingly, the control elements for the tools of the apparatus are housed space-savingly inside the handle constructed in the manner of a pistol grip and therefore are not apparent from outside.

With advantage, the trigger is fixed to the end of one of the arms of a U-shaped actuating stirrup, which is mounted pivotally inside the handle, bears with both its arms against control elements of the pneumatic valves and/or electrical microswitches, and is equipped with a restoring spring. This actuating stirrup makes possible the simultaneous actuation of the two pneumatic valves associated with the control of the pneumatic cylinder and piston assemblies for the two anvil parts and, possibly, of the microswitch used for activation of the ultrasonic energy. The use of a microswitch for this purpose, in addition to the two pneumatic valves, can however be dispensed with, if a pressure monitor is provided in the compressed air line situated outside the apparatus, which pressure monitor converts the change in pressure detected when the pneumatic valves are actuated into a switching pulse for activating the ultrasonic energy.

For accurate adjustment of the actuating stirrup, the pivoting movement of the actuating stirrup in the direction of actuation of the trigger may be limited by an adjustable stop.

In an alternative form, the trigger is provided on a slider, guided in a straight line and generally parallel to the central axis of the sonotrode in the handle, against which slider the actuating arm of a microswitch and restoring springs act. In this form of the apparatus, only one single microswitch is present in the pistol-grip type handle, by which microswitch the pneumatic valves, located in this case outside the apparatus, and also the switching devices for actuating the ultrasonic energy are remotely controlled.

Furthermore, the present apparatus can be so constructed, in the interests of a compact construction which protects its functional parts, that the sonotrode, a booster provided for amplifying the amplitude of the ultrasonic vibrations, and the converter used for converting high-frequency electrical oscillations into ultrasonic vibrations, are combined in known manner coaxially to a single combined unit, which in the region of the booster and of the converter is surrounded by a sleeve co-axial therewith, to form a peripheral gap space, which is open at its forward end for passage of the sonotrode, mounts in the vicinity of its forward end the booster solely at one point, and for its part is radially clamped by its forward end in a housing bore, the combined unit being additionally mounted on the sonotrode in the housing.

It is of advantage if the housing bore is constructed in the manner of a clamping strap, by slits formed in the housing wall.

At its rear end, the sleeve is advantageously closed by a lid, which is equipped with supply elements for the electrical connection of the converter.

In one embodiment which still further improves the handiness of the apparatus in specific cases of use, the longitudinal axis of the compaction chamber makes an acute angle of at most about 30°, preferably about 20°, with the central axis of the sonotrode. This special form of embodiment makes possible an oblique fitting of the apparatus up to the electrical conductors that are to be joined at a node, the longitudinal axis of the compaction chamber being orientated parallel to the conductors. The apparatus then does not come into contact with the conductor cord or the like, except at its forward tool zone. It has been found that the longitudinal axis of the sonotrode and thus the direction of the ultrasonic vibrations can deviate from the orientation of the electrical conductors by up to about 30°, without adverse effects on the connecting of the electrical conductors to form a node thereby occurring.

The described apparatus is distinguished especially by small dimensions, a slender form, easy handling and suitability for use even in welding locations that are difficult of access.

In a further embodiment, the apparatus may be constructed for still more wide ranging use, especially for those situations where it would appear, for example due to the large number of individual strands to be joined, to be desirable to place the strands to be joined in the compaction chamber by using both hands.

This further form of the apparatus is characterised in that the handle is releasably attached to the housing and can be exchanged for a coupling element, which can be pushed onto and removed from a base block provided for stationary mounting. The base block, which may be secured, for example, to a working table, permits the use of the apparatus at a table or bench device if, instead of the pistol grip type of handle, the coupling element is secured to the apparatus. In this case the apparatus no longer needs to be guided by hand, so that the operator has both hands free for feeding the compaction chamber.

Preferably, the apparatus is here so constructed that the compressed air ducts present in the housing can be connected in sealing manner to compressed air ducts aligned therewith in the coupling element, that the electrical connection of the components combined with the sonotrode is effected by a connecting cable leading to the coupling element, which cable adjoins electrical conductors provided in the coupling element, that the compressed air ducts and the electrical conductors are conducted out of a free surface of the coupling element as plug elements, that corresponding socket elements are disposed in one face of the base block, these socket elements being connected with compressed air lines or electrical lines leading out from the socket, and that an electrical connecting socket for the connection of the connecting cable of a foot-operated switch controlling the compressed air drive of the anvil parts and the ultrasonic action, is mounted on the base block.

This preferred form of the further embodiment advantageously makes it possible for a plurality of base blocks for spacially separated welding positions to be provided at a working place, all the base blocks being connected centrally to one compressed air source and one generator for the ultrasonic energy. The apparatus can then be pushed onto or removed from the base blocks situated at the various points, as desired according to the work requirements. Furthermore, this form of construction offers the possibility of rapidly replacing, in case of need, the ultrasonic welding device itself, for example if a specific base block is to accept a welding device having differently adjusted or differently constructed welding tools. In this case, conversion of the actual ultrasonic welding apparatus is unnecessary, because the welding apparatus can be exchanged without waste of time for a different welding apparatus, which is equipped to suit the particular requirements.

The arrangement advantageously is such that the coupling element and the base block are releasably engaged with one another when fitted together. As a result, unintentional loosening of the apparatus together with the coupling element fixed thereon from the base block is avoided.

An advantageous possibility for a releasable locking together is achieved if the plug elements and socket elements for the compressed air connections are constructed as known, self-locking and self-sealing couplings, of which the unlocking elements are connected force-transmittingly with unlocking sliders mounted externally on the base block.

With advantage, at least one earth plug is provided on the coupling element, which is associated with a corresponding earth socket in the base block. This measure serves for the electrical safety of the apparatus.

In order to facilitate damage-free introduction of the plug element into the socket elements, it is of advantage if a plurality of centring pins is fixed to the coupling element, which, when it is placed upon the base block, engage into corresponding centring sockets of the base block.

The further construction makes possible, using the same basic apparatus, the construction of this apparatus either as a hand welding pistol or as a table or bench device. Accordingly, if the apparatus is used as a table or bench device, all the control functions for the welding apparatus may be operated by a foot switch.

BRIEF DESCRIPTION OF THE DRAWINGS

For a better understanding of the invention, and to show how the same may be carried into effect, reference will now be made, by way of example, to the accompanying drawings in which.

DESCRIPTION OF THE PREFERRED EMBODIMENTS

For explaining the first form of embodiment of the apparatus, reference is first made to FIGS. 1 to 7. FIGS. 1 to 4 illustrate the pistol-like construction of the apparatus, wherein by a comparison of size of the pistol-type handle with the other parts of the apparatus, the small total dimensions of the apparatus are apparent. These small dimensions in conjunction with the slender form of the apparatus make the apparatus easy to use to an extent not hitherto known in ultrasonic welding apparatuses.

Figure 3:
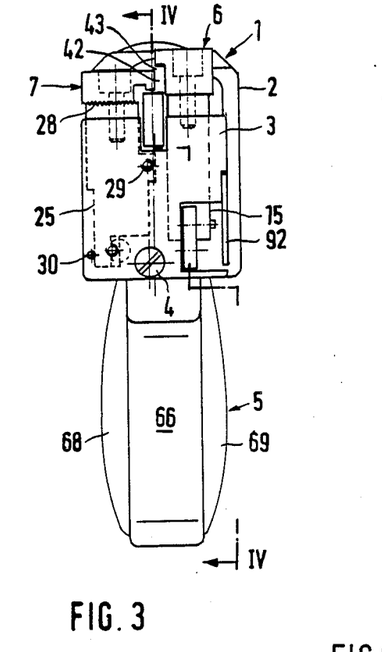
FIG. 3 is a front view of the apparatus shown in FIGS. 1 and 2.

The housing of the apparatus, referenced generally 1, is composed of a housing block 2 and a forward housing head 3. The housing block 2 and housing head 3 are releasably connected together by several screws, of which only the screw 4 which can be seen in FIG. 3 is shown. At the rear end of the housing block 2 and preferably in one piece with it, the handle 5 of pistol-grip type adjoins. The housing block 2, housing the head 3 and handle 5 are constructed for housing and seating the functional parts of the apparatus in a manner to be described. The housing head 3 mounts a vertically slidable anvil part 6 and a transversely displaceable anvil part 7, while in the housing block 2 the pneumatic cylinder and piston assemblies 8 and 9, provided for moving the two anvil parts 6 and 7, are housed. Furthermore, the sonotrode 10 and the associated parts combined with it to form one combined unit 11, are fixed to the housing block 2. Inside the handle 5 there is a trigger 12 for actuating the control elements for the apparatus, which will be explained below and, in the example shown, are also housed inside the handle 5.

The anvil part 6 possessing a lateral projection 13 is connected by a screw 14 (FIG. 2) firmly to a rod 15, which is mounted so as to be slidable up and down, but non-rotatable, in the housing head 3. The mutually facing surfaces of the anvil part 6 and rod 15 are equipped with intermeshing serrations (FIG. 1), in order to prevent rotation of the anvil part 6 relative to the rod 15 after the screw 14 has been tightened up. At its lower end, the rod 15 is fork-shaped and guides, in its fork slit, a transmission element 17, which is displaceably guided perpendicularly to the rod 15 of the anvil part 6 in the housing head 3. The transmission element 17 is firmly connected, at its inner end, with the piston rod 18 of the pneumatic cylinder and piston assembly 8. The piston rod 18 passes, longitudinally slidable and sealed, through a cylinder head 19, which closes the cylinder 20 formed in the housing block 2. The piston 21 is fixed to the inner end of the piston rod 18. This assembly is double-acting, i.e. the piston 21 can be subjected to compressed air alternately on either side by compressed air lines, not shown in FIG. 4 but advantageously situated in the housing block 2. As can be seen from FIGS. 1 and 4, the pneumatic cylinder and piston assembly 8 is disposed axially parallel to the sonotrode 10.

Figures 1, 2:
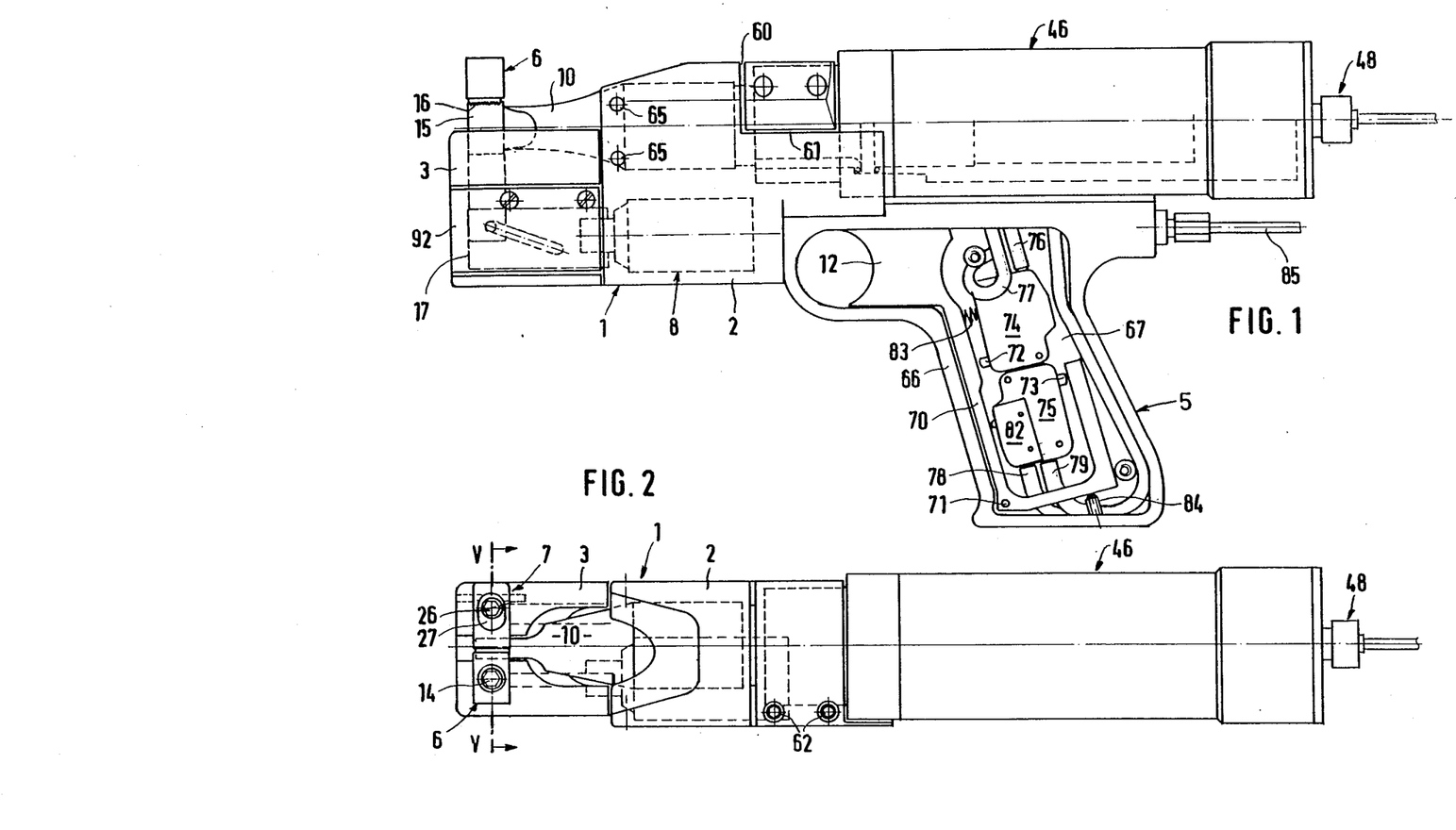
FIG. 1 shows a side view of a first form of apparatus for connecting elongate material by means of ultrasonics.
FIG. 2 is a plan view of the apparatus shown in FIG. 1.
Figures 4, 7:
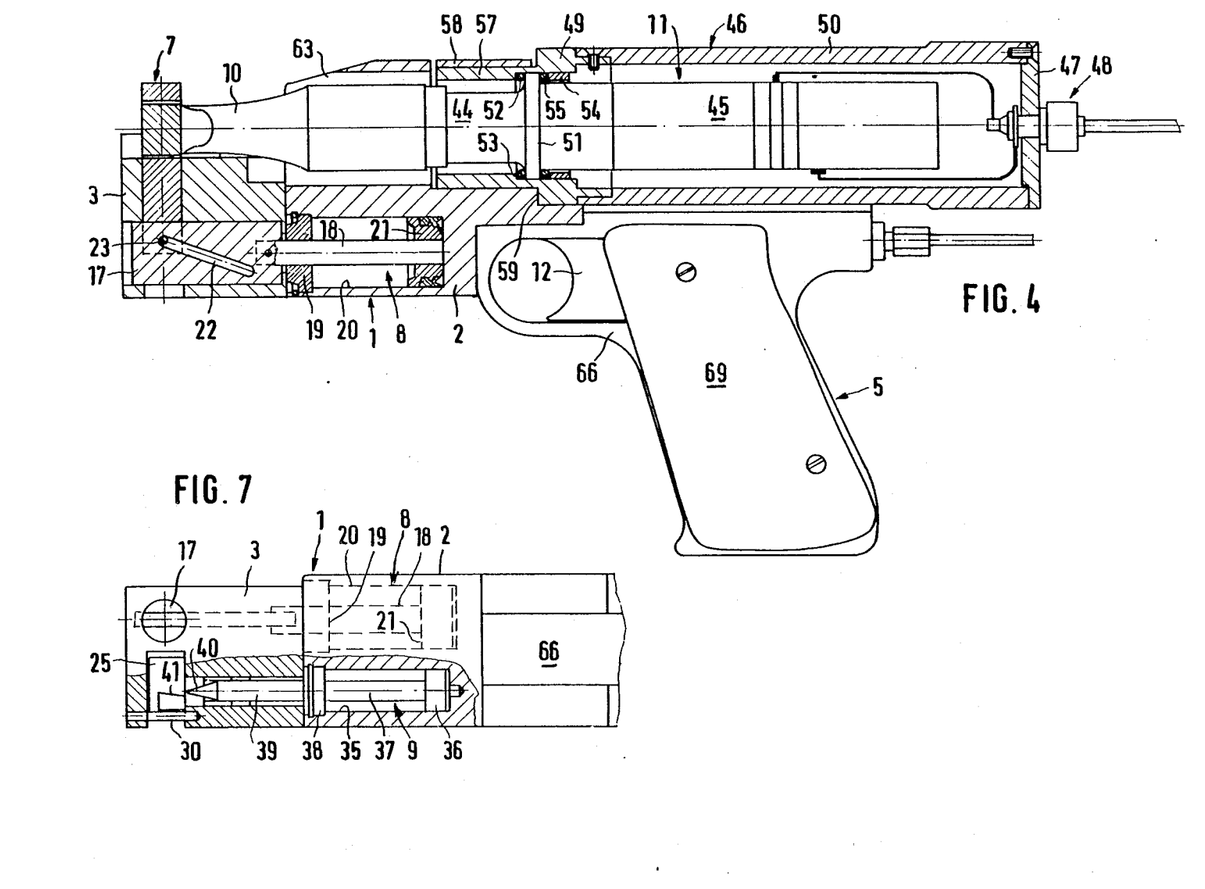
FIG. 4 is a longitudinal section through the apparatus along the cranked line IV—IV in FIG. 3.
FIG. 7 is a partial and partly cut-away bottom view of the apparatus of FIGS. 1 to 6.

The transmission element 17, guided in the housing block 2 longitudinally slidable and parallel to the central or longitudinal axis of the sonotrode 10, possesses a link slit 22, which forms an acute angle, ascending outwards, with the rectilinear movement direction of the transmission element 17 and guides a guide pin 23, mounted transversely on the rod 15. In FIGS. 1 and 4, the piston 21 is situated in its inner limiting position, to which there corresponds a position of the guide pin 23 in the outer limiting position in the link slit 22. In this position of the components, the rod 15 and therefore the anvil part 6 are displaced to the maximum upwards. If, in contrast, the piston 21 with piston rod 18 and transmission element 17 are displaced outwards, then the guiding engagement of the guide pin 23 in the link slit 22 causes a downward displacement of the rod 15 and the anvil part 6. In this manner the rectilinear working movement of the pneumatic cylinder and piston assembly 8 is converted at right angles into a displacement movement of the rod 15 and the anvil part 6 orientated up and down.

The anvil part 7 also possesses a projection 24, which co-operates in a manner to be described with the lateral projection 13 and the sonotrode 10. The anvil part 7 is fixed, transversely adjustable, by means of a screw 26 to the outer end of a pivoting component 25. For this purpose, the screw 26 is disposed inside an elongated hole 27 (FIG. 2). For preventing rotation of the anvil part 7 with respect to the pivoting component 25, serrations 28 which mesh with one another when the screw 26 is tightened up are disposed on the contact surfaces of these components.

Figure 5:
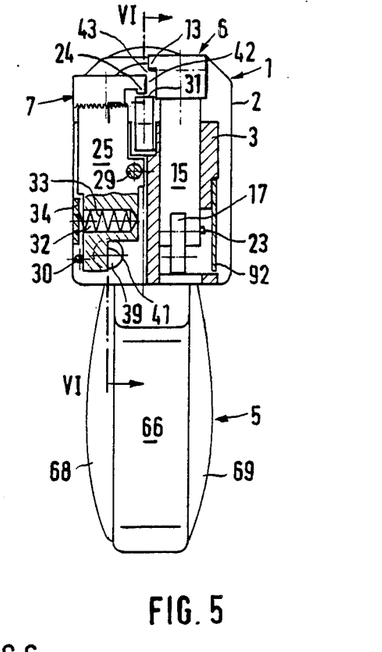
FIG. 5 is a cross-section on line V—V in FIG. 2.
Figure 6:
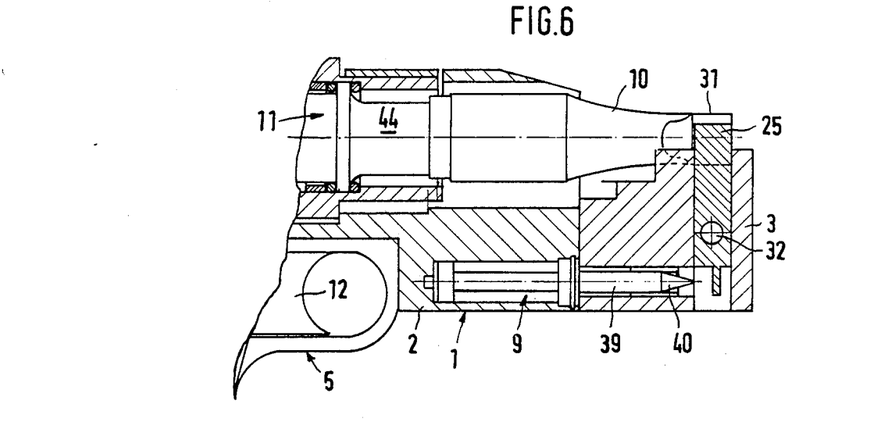
FIG. 6 is a partial section substantially on the line VI—VI in FIG. 5.

The pivoting component 25 is mounted in the manner of a two-armed lever pivotally about a bearing pin 29 fixed in the housing head 3. The pivoting movement of the pivoting component 25 is limited by a stop 30, fixed on the housing head 3 (FIGS. 3, 5). This stop 30 prevents the projection 24 of the anvil part 7 from touching the working surface 31 of the sonotrode 10 when the pivoting component 25 is pivoted clockwise (refer to FIG. 5). The stop 30 is so arranged that a desired, narrow gap dimension is maintained between the downwardly orientated surface of the projection 24 and the working surface 31. In a bore 32 of the pivoting component 25, there is a compression spring 33, which bears with its inner end against the base of the bore and bears with its outer end against a plate releasably fixed to the housing head 3. The prestressed compression spring 33 biases the pivoting component 25 in a counter-clockwise pivoting movement, in which the pivoting component 25 lifts off the stop 30 with its lower end. The compression spring 33 therefore causes the opening movement of the anvil part 7 from its closed position, shown in FIGS. 3 and 5.

For explaining the compressed air drive of the anvil part 7 and the pivoting component 25 belonging to it, reference is now made basically to FIGS. 5 and 7. As FIG. 7 shows, in addition to the already described pneumatic cylinder and piston assembly 8 and axially parallel with it, there is in the housing block 2 a further cylinder 35, in which an also double-acting piston 36 is slidable, the piston rod 37 of which is sealingly guided through a cylinder head 38, closing the cylinder 35 at the outside. To the outer end of the piston rod 37, a rod-shaped transmission element 39 is attached, which may also be formed in one piece with the piston rod 37. At its outer end, the transmission element 39, which is mounted longitudinally slidable in a corresponding bore of the housing head 3, carries a cone 40, which co-operates with a corresponding counter-surface 41, which is disposed at the lower end of the pivoting component 25. The cone 40 and counter-surface 41 each make an acute angle with the rectilinear direction of working movement of the transmission element 39. It can be seen that, with an outward displacement of the transmission element 39, illustrated in FIGS. 6 and 7 in its inner limiting position, the external periphery of the cone 40 runs onto the counter-surface 41, and thereby pivots the pivoting component 25 against the force of the compression spring 33 as far as its position shown in FIG. 5, which corresponds to the working position of the anvil part 7. The pivotal movement of the pivoting component 25 is terminated by the stop 30. If the transmission element 39 is again moved, in order to produce the opening movement of the anvil part 7, back into its position shown in FIG. 7, then the pivoting component 25 rotates under the action of the compression spring 33 counter-clockwise (refer to FIG. 5).

In the example shown, the transmission element 17 equipped with the link slit 22 is associated with the anvil part 6 mounted slidable in a straight line in the housing, whereas the transmission element 39 equipped with the cone 40 is associated with the pivotal anvil part 7. The arrangement may also be such that the transmission elements for both the anvil parts are of the same construction, i.e. either a link guide or obliquely orientated guide paths in the form of conical surfaces or the like may be provided. Instead of a rotationally symmetrical cone end on the transmission element 39, a simple inclined surface may also be provided, which co-operates with the counter-surface 41.

The bearing pin 29 of the pivoting component 25 is so arranged, in respect of the central or longitudinal axis of the sonotrode 10, that at the start of an opening pivoting movement the lower surface of the projection 24 moves further away from the working surface 31 of the sonotrode. Instead of the described pivoting capability of the anvil part 7, this may also be constructed to be slidable parallel to the working surface 31 and perpendicularly to the direction of sliding of the anvil part 6.

The two anvil parts 6 and 7 define, together with the working surface 31 of the sonotrode 10, a compaction chamber 42 for the electrical conductors to be welded together by the ultrasonic effect. As can be seen from FIGS. 3 and 5, the compaction chamber 42 is bounded at the bottom by the working surface 31, at the top by the surface of the lateral projection 13 on the anvil part 6 facing towards this working surface and parallel to it, at the right by a surface of the anvil part 6 parallel to the right-hand lateral surface of the sonotrode and forming a narrow gap with it, and finally, at the left by a surface of the projection 24 of the anvil part 7 orientated parallel to this last-mentioned surface. In FIGS. 3 and 5, the anvil part 7 is shown already in its closed position, whereas the anvil part 6 is in its opened position. If electrical conductors to be welded together are to be laid in the compaction chamber 42, or already welded conductors are to be removed from it, then as a difference from the illustration of FIGS. 3 and 5, the anvil part 7 is pivoted to the left, so that a gap 43, permitting introduction and removal, is formed between the adjacent edges of the projections 13 and 24. After the conductors to be welded together are introduced, the horizontally moveable anvil part 7 is first moved into the closed position shown in FIGS. 3 and 5, whereupon the vertically moveable anvil part 6 is moved downwards, to close the compaction chamber 42 and compress the electrical conductors together. When the desired compression of the conductors has been obtained, the ultrasonic energy is activated for a sufficient period of action. When the compaction chamber 42 is opened, the parts of the apparatus are actuated in the reverse sequence. A simultaneous movement of the anvil parts 6 and 7 is also possible.

Figures 8, 9:
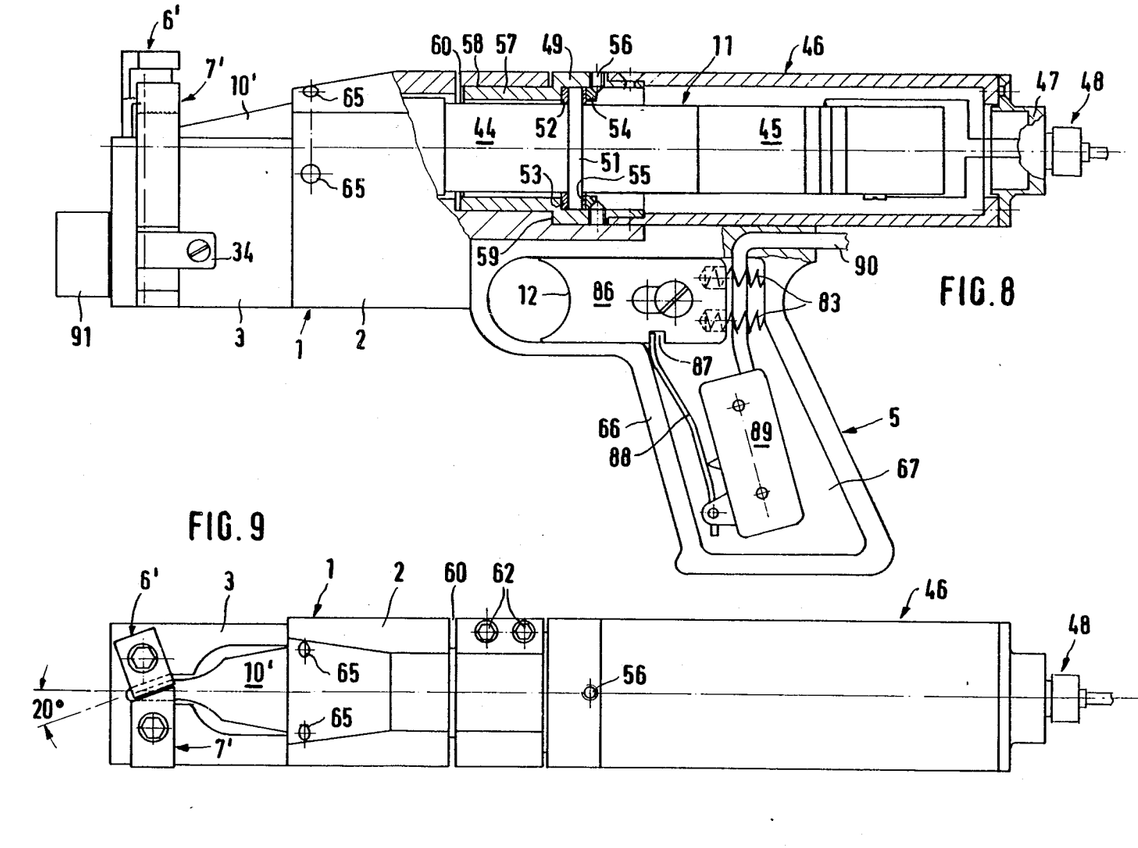
FIG. 8 is a partly cut-away side view of a second form of the apparatus.
FIG. 9 is a plan view of the apparatus shown in FIG. 8.
Figure 10:
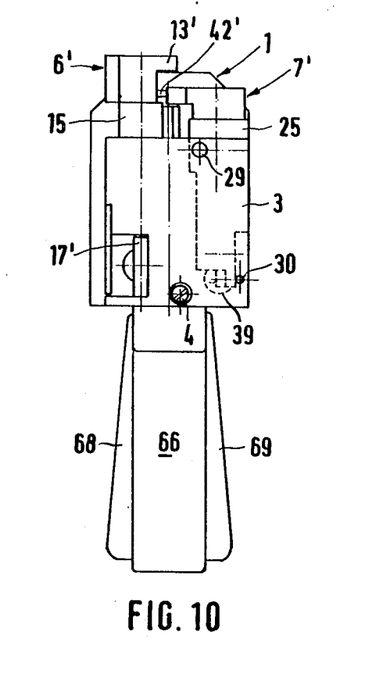
FIG. 10 is a front view of the apparatus shown in FIGS. 8 and 9, FIGS. 11 and 12 are partial longitudinal sections through the front region of the apparatus in different sectional planes of the apparatus.

In the embodiment shown in FIGS. 1 to 7, the working surfaces of the two anvil parts 6 and 7 and of the sonotrode 10 which bound the compaction chamber 42 are so orientated that the longitudinal axis of the compaction chamber 42 is parallel to the sonotrode longitudinal axis. Accordingly, in this example, the electrical conductors must be laid parallel to the sonotrode longitudinal axis in the compaction chamber 42 and removed in the same orientation. In the example shown in FIGS. 8 to 12, in contrast, the working surfaces of the two anvil parts 6' and 7' bounding the compaction chamber 42' are so orientated that the longitudinal axis of the compaction chamber makes an acute angle of about 20° with the central axis of the sonotrode 10', as shown in FIG. 9. This is achieved by a corresponding chamfer or skew of the one outer surface of the sonotrode and corresponding oblique orientations of the working surfaces and other co-operating surfaces of the two anvil parts 6' and 7'. Further special features of the example shown in FIGS. 8 to 12 are now explained in greater detail below.

In both examples, as can be seen from FIGS. 4 and 8, the combined unit 11 consists of the sonotrode 10 or 10', the booster 44 and the converter 45. Booster 44 and converter 45 are surrounded by a sleeve 46 coaxial with them, forming a peripheral gap space. The sleeve 46 is open at its front end for the passage of the sonotrode 10, 10' respectively, and is closed at its rear end by a lid 47, which is equipped with supply elements 48 for the electrical connection, i.e. the high-frequency connection, of the converter 45. Although individual components of the two embodiments may be of different construction, those components that are the same in their function are denoted by the same reference numerals, to assist in understanding.

The sleeve 46 is composed of a forward sleeve part 49 and of a rearward elongate tube part 50. The combined unit 11 is mounted fixed in the sleeve 46 only at one position of the booster 44. For this purpose, the booster 44 is equipped with a peripheral flange 51 (FIGS. 4 and 8), which bears through an elastic element 52 against an annular shoulder 53 in the sleeve part 49. The pressing of the peripheral flange 51 against the annular shoulder 53 for firmly mounting the combined unit 11 inside the sleeve 46 is effected by a clamping ring 54, which bears against the peripheral flange 51 through the intermediary of a further elastic element 55. In the embodiment shown in FIG. 4, the clamping ring 54 is a ring equipped with an external thread, which is screwed into a corresponding internal thread inside the sleeve part 49. In the embodiment shown in FIG. 8, the clamping ring 54 is a ring having an outer cone, which is pressed by several pin screws 56, acting upon this outer cone, against the peripheral flange 51 through the intermediary of the elastic element 55.

The forward sleeve part 49 possesses, at the front, a cylindrical projection 57 of reduced external diameter, which is pushed into a housing bore 58, of corresponding diameter, of the housing block 2 until the sleeve part 49 comes to bear against a step 59 of the housing block 2. The housing bore 58 is formed in the manner of a clamping strap by slits 60 and 61 formed in the wall of the housing block 2 (FIG. 1). By the tightening-up of screws 62 (FIG. 9), the cylindrical projection 57 is radially clamped, causing the sleeve 46 to be firmly fixed on the housing 1. Concentrically to the housing bore 58, a through bore 63 is disposed in the housing block 2, through which the sonotrode 10 is conducted without contact. In order to obtain a second bearing position for the combined unit 11, several screws 64, engaging transversely into the through bore 63, are provided orientated in a common plane perpendicular to the sonotrode axis, of which only the bottom screw is shown in the drawings in FIG. 11, whereas in FIGS. 1, 8 and 9 only the threaded bores 65 for other screws are shown. The screws 64 support the sonotrode 10 in the last ultrasonic node point before the working end of the sonotrode, so that ultrasonic vibrations cannot act upon the screws 64.

A special feature of the embodiment shown in FIGS. 8 to 12 consists in that the two anvil parts 6' and 7', moveable in different directions, are disposed opposite and compared to the embodiment according to FIGS. 1 to 7. The same is true also for the associated pneumatic cylinder and piston assemblies 8 and 9.

Figure 12:
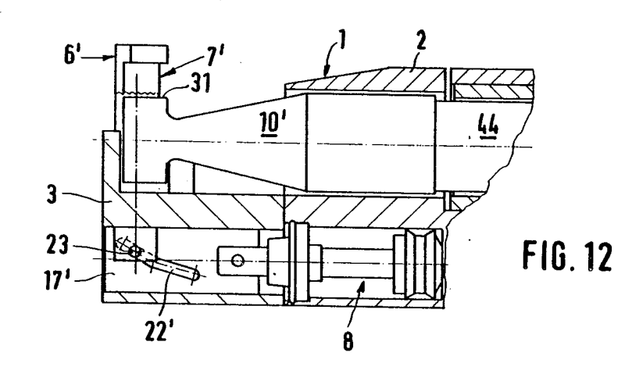

Furthermore, the second embodiment differs in respect of the form of the link slit 22' from the first embodiment, as can be seen from a comparison of FIGS. 4 and 12. Whereas, in the example shown in FIG. 4, the link slit 22 has a rectilinear form, the link slit 22' has a kink approximately at its centre. As a result the outwardly situated region of the link slit 22' is steeper than the inner region. As a result of this form, a different movement characteristic results for the anvil part 6'. On the assumption of a uniform displacement speed of the transmission element, the anvil part 6' is driven initially more rapidly in its downwardly orientated closure displacement so long as the guide pin 23 is moving in the more steeply inclined portion of the link slit 22'. As soon as the guide pin 23 enters the less steep portion of the link slit 22', the movement speed of the anvil part 6' becomes lower, but at the same time the compression force that the lateral projection 13' of the anvil part 6' exerts upon the electrical conductors placed in the compaction chamber 42' becomes greater. At the start of the downward displacement of the anvil part 6', in contrast, a larger compression force is not required, so that this movement phase can be carried out at a higher velocity. The link slit 22 in the embodiment shown in FIGS. 1 to 7 could, of course, also have a kinked form.

A consideration of FIGS. 1, 4 and 8 immediately shows that the handle 5 is fitted somewhat below the centre of gravity of the remaining parts of the apparatus, combined to form one unit, with the result that the apparatus rests in a balanced position in the operator's hand. The handle 5 may be in one piece with the housing 1 or may be made separately therefrom and later joined to the housing. The handle 5 is formed basically of a frame 66, which possesses an external contour imitating that of a pistol grip. In its interior, the frame 66 comprises a cavity 67, closed on both sides by screwed-on shells 68 and 69, of which the shell 69 is not shown in FIGS. 1 and 8.

In the embodiment illustrated in FIG. 1, the trigger 12 is fixed to the end of the longer arm of a U-shaped actuating stirrup 70, or is in one piece with this actuating stirrup 70. The actuating stirrup 70 is pivotally journalled on a bearing pin 71 mounted on the frame 66. The two arms of the actuating stirrup 70 each bear against a control element 72, 73 respectively of pneumatic valves 74, 75 respectively, which are fixed inside the chamber 67.

Figure 11:
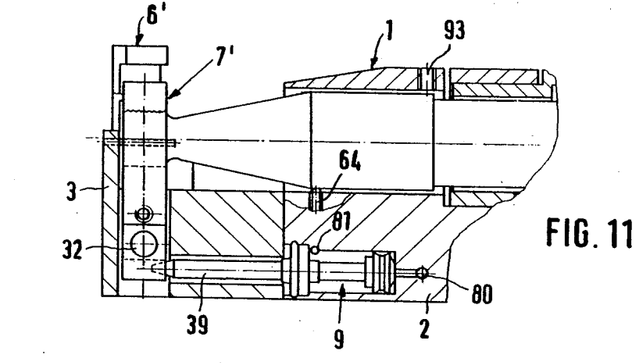

The pneumatic values 74 and 75 are each associated with one of the pneumatic cylinder and piston assemblies 8 and 9, with which they are in communication via compressed air lines 76 to 79, which are connected, inside the housing 1, to corresponding compressed air ducts, of which only the two compressed air ducts 80 and 81 relating to the cylinder and piston assembly 9 are illustrated in FIG. 11.

In the example shown in FIG. 1, a microswitch 82 is also fixed inside the chamber 67, the microswitch being switched by the longer arm of the actuating stirrup 70 for activating and deactivating the ultrasonic energy.

The trigger 12 is moved back into its at-rest position shown in FIG. 1 by a restoring spring 83, acting upon the actuating stirrup 70, as soon as the trigger 12 is no longer actuated. The pivotal travel of the actuating stirrup 70 is limited in the direction of actuation of the trigger 12 by an adjustable stop in the form of a threaded pin 84 screwed from below into the frame 66.

The connecting of the apparatus to a compressed air source is effected by the compressed air line 85, releasably connected with the handle 5. The electrical conductors leading to the terminals of the microswitch 82 may also be conducted in similar manner out of the handle 5.

The example illustrated in FIG. 8 is simplified compared with the above-described example, in respect of the internal equipment of the handle 5. In the present case the trigger 12 is provided on a slider 86, guided in a straight line and approximately parallel to the longitudinal axis of the sonotrode 10' in the handle 5, the slider bearing at its rear end against restoring springs 83, which bear with their outer ends against the frame 66. The restoring springs 83 push the trigger 12 into the position shown in FIG. 8, when the slider 12 is not actuated. The free end of an actuating arm 88 of a microswitch 89 engages into a notch 87 of the slider 86.

The electrical connections of the microswitch 89 are conducted out of the handle by the line 90. The microswitch 89 supplies the electrical pulse for controlling the pneumatic valves, which in the present example are situated outside the apparatus and are associated with the pneumatic cylinder and piston assemblies 8 and 9. Appropriate pneumatic lines (not shown) are, of course, also connected to the handle 5.

In FIG. 8, a protective cap 91 is shown, which may be removeably fitted to the forward end of the apparatus and receives the transmission element 17, 17' respectively, when the latter travels out beyond the front face of the housing head 3 for actuating the anvil part 6, 6' respectively. Reference 92 in FIGS. 1, 3 and 5 denotes a cover plate, releasably fixed to the housing head 3, for covering the transmission elements 17, 17' respectively. The present apparatus can be suspended from above, so that for example when not in use it does not need to be placed down on a support surface. For this purpose, a threaded bore 93 may be provided, as shown in FIG. 11, at a suitable point of the housing 1. An eye or the like, for example, may be connected to the threaded bore 93.

As can be immediately seen from the drawings in conjunction with the foregoing description, the height of the compaction chamber 42, 42' respectively depends upon the lower position of the lateral projection 13 of the anvil part 6. The width of this compaction chamber can be adjusted by replacing the upper part of the anvil part 6, 6' which carries the lateral projection 13, different upper parts being equipped with different projection lengths for the lateral projection 13. The lateral position of the upper part of the other anvil 7, 7' should then be adapted to the length of the lateral projection 13.

As described above, the compaction chamber 42, 42' respectively is bounded by three anvil faces and one working face 31 of the sonotrode. Although it has been mentioned that the three anvil faces are located on a two-part anvil 6, 7 or 6', 7' respectively, the anvil nevertheless could comprise more than two parts. Thus, for example, the anvil part 6 may be composed of two parts in relation to FIG. 5, namely an upper crosshead which forms the lateral projection 13 and an intermediate block to be fitted between crosshead and rod 15. This form of construction of the anvil part 6, 6' is obtained if, for example, in FIG. 5 the anvil surface orientated parallel to the working surface 31 and situated at the bottom of the lateral projection 13 is continued to form a dividing surface across the width of the anvil part 6, as indicated in FIG. 5 by a dot-and-dash line. The thus formed crosshead can be made laterally adjustable, in order to enable the width of the compaction chamber to be varied. The aforementioned intermediate block may be combined also in one piece with the rod 15, the crosshead being adjustably screwed to this block.

The welding apparatus illustrated in FIGS. 13 to 17 corresponds to the form of embodiment shown in FIGS. 8 to 12. This apparatus also consists basically of a housing 1, composed of housing block 2 and housing head 3, an anvil part 6', slidably guided vertically by the housing head 3 by means of an upwardly and downwardly slidable rod 15, an anvil part 7', which is fixed to a pivoting component 25, pivotally journalled by a bearing pin 29 on the housing head 3, of a sonotrode 10', which together with a booster 44 and a converter 45 is combined to one combined unit 11, fixed to the housing block 2, of a sleeve 46, surrounding the combined unit 11 and closed at its rear end by a lid 47, of supply elements 48 on the lid 47 for the electrical connection of the converter 45, of a transmission element 17', for driving the rod 15 in both vertical directions, mounted rectilinearly displaceable in the housing 1 and driven by a pneumatic cylinder and piston assembly (not shown), and of a transmission element 39 for a pivotal drive of the pivoting component 25. The anvil part 6' and 7', together with the sonotrode 10', define a compaction chamber 42'.

Figure 13:
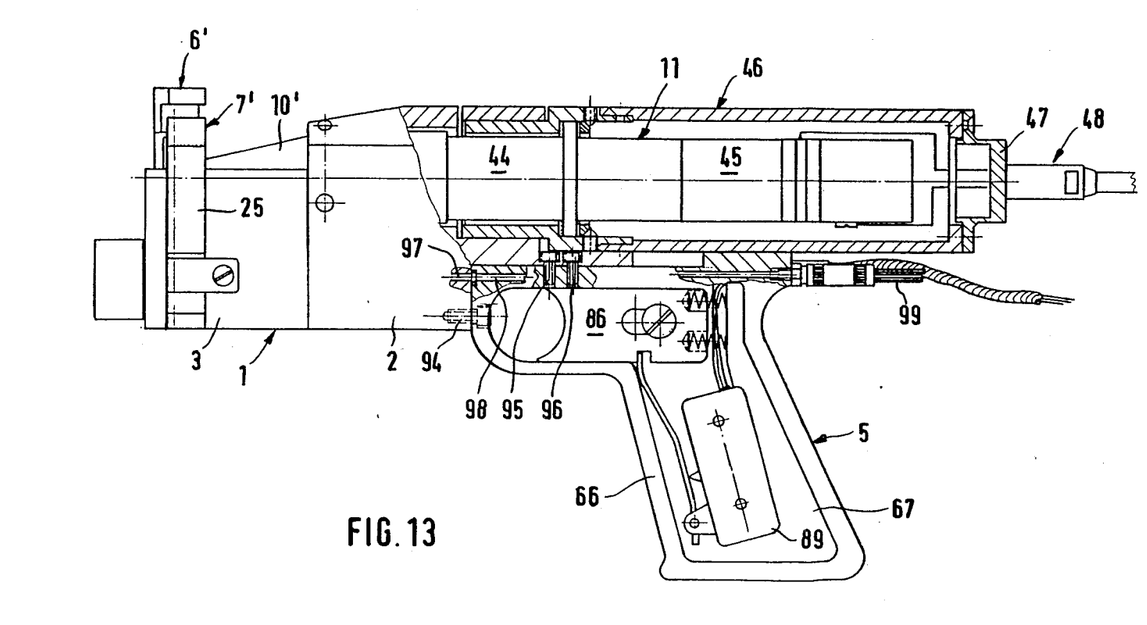
FIG. 13 is a partly cut-away side view of the apparatus with a handle of a pistol grip type releasably attached thereto.
Figure 14:
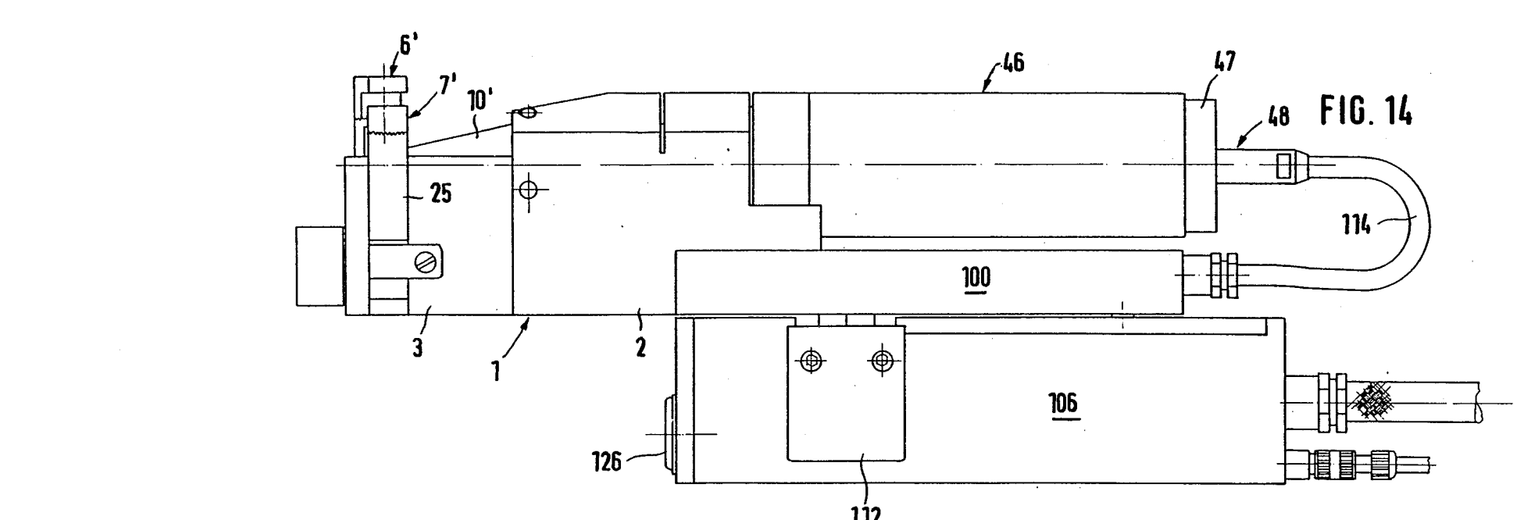
FIG. 14 is a side view of the apparatus with a coupling element attached thereto, pushed onto a base block.
Figure 15:
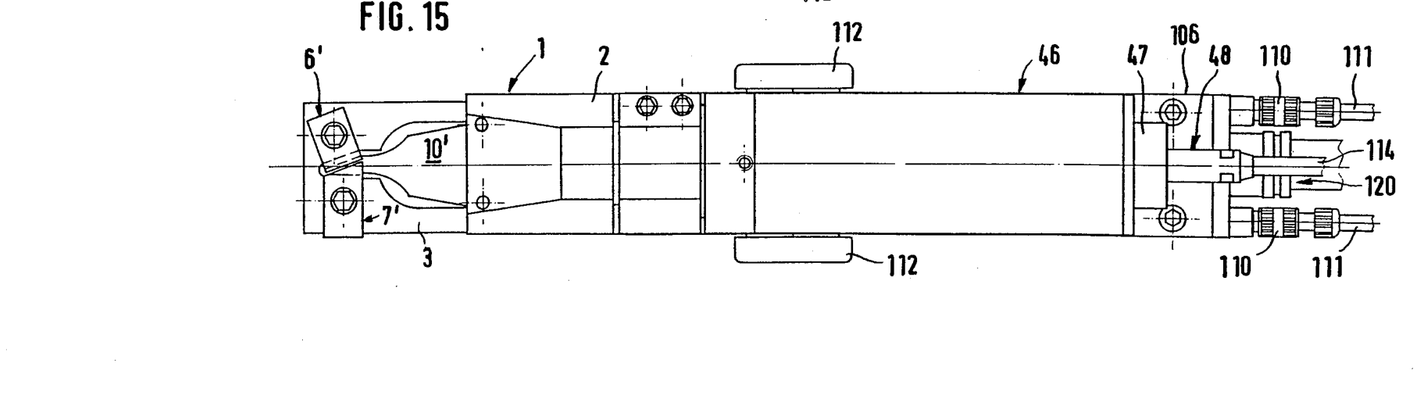
FIG. 15 is a plan view of the assembly shown in FIG. 14.

As can be seen from FIG. 13, a pistol grip type handle 5 can be connected with the above-described apparatus by screws 94, 95 and 96 engaging with the housing block 2. The pistol grip form of the handle 5 is formed by a correspondingly shaped frame 66, which encompasses a chamber 67, in which an actuating slider 86 is mounted and a microswitch 89, actuated by it, is housed. The microswitch 89 supplies the electrical pulse for controlling the pneumatic valves provided for the two anvil movements, these valves being situated outside the apparatus. Compressed air ducts, disposed in the housing 1, of which only the forwardly situated compressed air duct 97 can be seen in FIGS. 13 to 17, form the connection to the two pneumatic cylinder and piston assemblies, not shown here and disposed inside the housing. These compressed air ducts are aligned with and sealingly connected to corresponding compressed air ducts in the handle 5, of which once again only the front compressed air duct 98 can be seen from FIG. 13. To each of the two compressed air ducts in the handle 5, a compressed air line is removably connected, of which only the front compressed air line 99 can also be seen in FIG. 13.

Figures 16, 17:
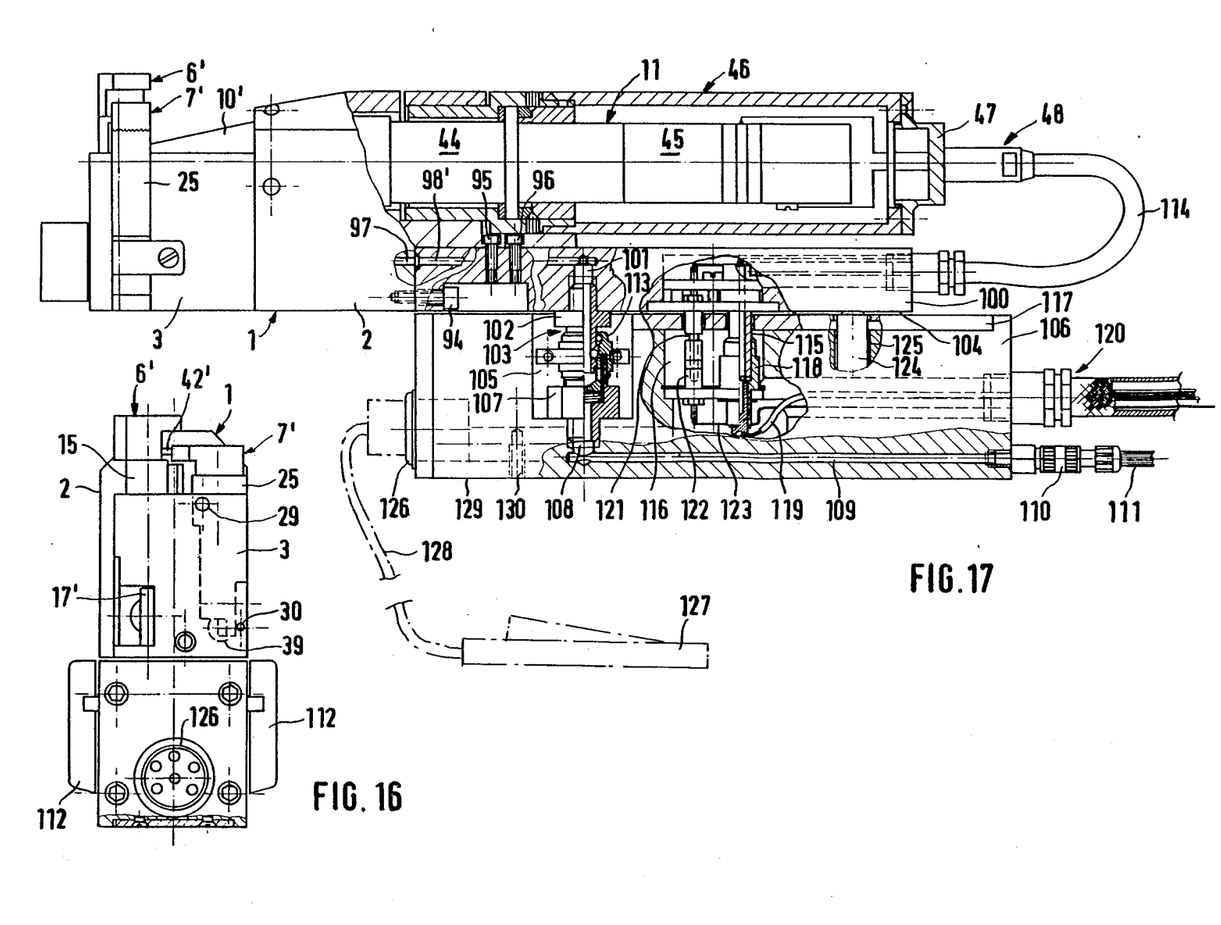
FIG. 16 is a front view of the assembly shown in FIGS. 14 and 15.
FIG. 17 is a partly cut-away side view of the assembly shown in FIG. 14.

As can be seen from FIGS. 14 to 17, especially FIG. 17, instead of the pistol grip type handle 5, a plate-shaped coupling element 100 is here fixed to the housing 1 of the apparatus by means of the screws 94 to 96. As can be seen from the drawings, the coupling element 100 is adapted in its external dimensions to the apparatus in such a way that it is flush all around therewith and does not project. In the coupling element 100 there are also compressed air ducts, sealed to the housing and aligned with the compressed air ducts 97 in the housing 1, only the front duct 98' being visible in FIG. 17. The compressed air ducts 98' each lead into a perpendicular transverse bore 101, into which the plug element 102 of a self-locking and self sealing pneumatic coupling 103, illustrated in FIG. 17 partly in section and partly in elevation, is screwed. The plug element 102 projects out of a lower, free face 104 of the coupling element 100. The pneumatic couplings 103 are housed in a chamber 105 inside a base block 106, connected to the coupling element 100 in a manner to be described. For this purpose, the socket elements 107 which are complementary with the plug elements 102 are screwed into transverse bores 108 in the base block 106. In FIG. 17, only the forwardly situated arrangement of each can be shown, i.e. a pneumatic coupling 103 with its elements 102 and 107 and one of the transverse bores 108. A compressed air duct 109, leading longitudinally through the base block 106, communicates with each transverse bore 108. A compressed air line 111 is connected to each of the compressed air ducts 109 by a releasable connecting piece 110. The chamber 105 is covered by unlocking sliders 112, mounted on either side of the base block 106, these unlocking sliders 112 being each connected force-transmittingly with the sleeve-shaped unlocking element 113 of the adjacent socket element 107. The pneumatic couplings 103 are of known construction, so that a further explanation of their constructional arrangement and the locking and sealing principle achieved by it is not necessary at this point.

The electrical connection of the converter 45 to the electrical conductors fitted isolated in the coupling element 100 is effected through a connecting cable 114, which is connected on the one hand to the supply elements 48 and on the other hand to the coupling element 100. The connecting cable 114 is connected, at one or both ends, in push-in manner with the lid 47 and the coupling element 100. The electrical conductors provided in the coupling element 100 lead outwards through plug elements from the lower face 104. The plug element 115 serves for connecting the combined unit 11 with the generator for high-frequency generation. For this purpose, in a further chamber 116 of the base block 106, which is closed at the top by a plate 117 equipped with openings for passage of the plug elements, a complementary socket element 118 is fixed, to which an electrical line 119 is connected, which is connected with the electrical terminal referenced generally 120 and leading out from the base block 106. The plug element 115 and the socket element 118 are shown in FIG. 17 partly in section and partly in elevation. In the example illustrated, an earth plug 121 also projects out of the lower face 104 of the coupling element 100, the earth plug engaging into a complementary earth socket 122, also fixed in the chamber 116. The earth socket 122 is connected with an earth conductor 123, which also leads out of the base block 106 via the electrical terminal 120.

In order to ensure damage-free plugging of the plug elements 102, 115 and 121 into the associated socket elements 107, 118 and 122, a plurality of centring pins 124 are fixed to the coupling element 100, also projecting out of its lower face 104, these pins engaging into corresponding centring bores 125 in the base block 106. In FIG. 17, only one centring pin 124 and one centring bore 125 are shown.

On the base block 106 there is also an electrical terminal socket 126 for connecting a foot-operated switch 127 via a connecting cable 128. The foot switch and connecting cable are illustrated in FIG. 17 by dot-and-dash lines. The foot-operated switch controls the compressed air drive of the anvil parts 6' and 7' and also activates the ultrasonic action upon the strands situated in the compaction chamber 42' and to be welded together. The electrical connections necessary for this purpose lead from the terminal socket 126, through the base block 106 and out through the electrical terminal 120. The welding apparatus is controlled by the foot switch 127 as follows. After the strands have been laid in the compaction chamber 42', the anvil part 7' first moves until it bears against the anvil part 6'. The compaction chamber 42', thus now enclosed on both sides, is now reduced in size by the descending anvil part 6', compacting the strands together. After activation of the ultrasonics, the strands are welded together, the anvil part 6' moving downwards until the strands are further completely compacted. After completion of the welding operation, the anvil parts 6' and 7' automatically travel back into their respective starting positions, causing the apparatus to be ready for the next working cycle.

In the lower face 129 of the base block 106, there are several threaded bores 130, of which only one can be seen from FIG. 17, for the stationary fixing of the base block onto a table or the like.

I claim:

1. An apparatus for joining, by means of ultrasonics, elongate material, such as wires, cords, sheet strips or the like, the apparatus comprising a housing, a sonotrode mounted on the housing for generating ultrasonic vibrations, a two-part anvil comprising three working surfaces, and a compaction chamber, which chamber is adjustable in its cross-sectional dimensions to accommodate the size of the objects to be joined, the compaction chamber being bounded by the sonotrode and the three working surfaces of the anvil and having end faces which are open for the passage of the objects to be joined, the two parts of the anvil being mounted on the housing so as to be moveable in two different directions relative to each other and to the sonotrode, and there being pneumatic piston and cylinder assemblies in the housing alongside each other and axially parallel to each other and to the longitudinal axis of the sonotrode; the apparatus further comprising transmission elements on which said piston and cylinder assemblies act, which transmission elements are arranged to actuate said movable anvil parts and there being a handle mounted in the manner of a pistol grip on the housing, which handle is equipped with a trigger controlling the movement of the anvil parts and the actuation of said sonotrode.

2. An apparatus according to claim 1, wherein said handle is mounted on the housing somewhat below the center of gravity of the other parts of the apparatus combined into one unit.

3. An apparatus according to claim 1, wherein said transmission elements are guided longitudinally slidably in the housing parallel to the longitudinal axis of the sonotrode, are each, on the one hand, firmly connected with the piston rod of the associated pneumatic piston and, on other hand, possess a guide path orientated at an acute angle to their rectilinear working movement direction, which guide path is inworking engagement with a guide element on the associate anvil part.

4. An apparatus according to claim 3, wherein at least one of said transmission elements possesses a link slit forming said guide path, into which a guide pin fixed to the associated anvil part engages.

5. An apparatus according to claim 3, wherein at least one of said transmission elements possesses, at its end, a cone forming said guide path, which bears against a corresponding counter-surface on the associate anvil part.

6. An apparatus according to claims 4 and 5, wherein one of said transmission elements is equipped with a link slit forming a said guide path which link slit receives a pin fixed to a said anvil part slidably mounted rectilinearly in the housing whereas another of said transmission elements is equipped at its end with a cone forming a said guide path which cone bears against a corresponding counter surface on a said anvil part pivotal about a bearing pin of the housing.

7. An apparatus according to claim 4, wherein said link slit possesses a kinked shape approximately at its centre, having a steeper zone for the initial phase of the closure displacement of the anvil part and a less steep zone for the concluding phase of its closure displacement.

8. An apparatus according to claim 1, wherein said trigger is constructed for actuating pneumatic valves and/or electrical microswitches inside the handle.

9. An apparatus according to claim 8, wherein said trigger is mounted on the end of one of the arms of a U-shaped actuating stirrup, which stirrup is pivotally mounted inside the handle and bears with its two arms against control elements of the pneumatic valves and/or an electrical microswitch, said trigger being equipped with a restoring spring which acts on said stirrup.

10. An apparatus according to claim 9, wherein the pivotal travel of the actuating stirrup in the actuating direction of the trigger is limited by an adjustable stop.

11. An apparatus according to claim 8, wherein said trigger is provided on a slider, guided in a straight line and approximately parallel to the longitudinal axis of the sonotrode in the handle, against which slider an actuating arm of a microswitch and a restoring spring act.

12. An apparatus according to claim 1, wherein a booster is provided for amplifying the amplitude of the ultrasonic vibrations and a converter is provided for converting high-frequency electrical oscillations into ultrasonic vibrations and wherein said sonotrode, booster and converter are combined coaxially as a single unit, there being a sleeve which surrounds coaxially the booster and the converter to form a peripheral gap space therebetween, said sleeve being open at its forward end for the passage of the sonotrode, said booster being peripherally supported by said sleeve only in the vicinity of the forward end of said booster, and there being a housing bore in which said sleeve is radially clamped at its forward end, said single unit being mounted in said housing.

13. An apparatus according to claim 12, wherein said housing bore is constructed in the manner of a clamping strap by slits formed in the housing wall.

14. An apparatus according to claim 12, wherein said sleeve has a rear end closed by a lid, which is equipped with supply elements for the electrical connection of the converter.

15. An apparatus according to claim 1, wherein the compaction chamber has a longitudinal axis which makes an acute angle of between 20° and 30°, with the longitudinal axis of the sonotrode.

16. An apparatus according to claim 1, wherein said handle is releasably secured to the housing and can be exchanged for a coupling element, which can be pushed onto and removed from a base block provided for stationary mounting.

17. An apparatus according to claim 16, wherein the coupling element and the base block are releasably engaged with each other.

18. An apparatus according to claim 16, wherein compressed air ducts are provided in the housing and in said coupling element, said ducts in said housing being connectable in sealed manner to said compressed air ducts aligned therewith in the coupling element, and wherein the electrical connection of components connected with the sonotrode is provided by a connecting cable leading to the coupling element, which connecting cable is jointed to electrical conductors provided in the coupling element, the compressed air ducts in said coupling element and the electrical conductors being conducted out of a free surface of the coupling element as plug elements and socket elements, respectively, which plug elements and socket elements are connected with compressed air lines and electrical lines respectively leading out from the base block, and an electrical connecting socket for the connection of the connecting cable of a foot-operated switch controlling the air supply to said compressed air ducts and also the power to said connecting cable, and hence to said sonotrode, is mounted on the base block.

19. An apparatus according to claim 18, wherein said plug elements and said socket elements are constructed as self-locking and self-sealing couplings, an unlocking elements of which is force-transmittingly connected with unlocking sliders mounted externally on the base block.

20. An apparatus according to claim 16, wherein at least one earth plug is provided on the coupling element, with which earth plug there is associated a corresponding earth socket in the base block.

21. An apparatus according to claim 16, wherein said base block has centering bores and wherein a plurality of centering pins is fixed to the coupling element, which pins, when said coupling element is mounted on the base block, engage into the corresponding centering bores of the base block.

* * * * *